United States Patent [19]
McAfee

[11] 3,736,816
[45] June 5, 1973

[54] AUTOMOTIVE WHEEL SUSPENSION BALL JOINT TONGS

[76] Inventor: Loyd O. McAfee, 9036 S. W. 37th, Seattle, Wash. 98126

[22] Filed: Feb. 24, 1971

[21] Appl. No.: 118,397

[52] U.S. Cl..................81/3 R, 269/214, 269/238, 269/249, 33/165, 33/180 AT
[51] Int. Cl..........................B25b 5/06, B25b 1/06
[58] Field of Search..............81/3 R, 134; 33/165, 33/180 AT; 269/249, 165, 210, 238, 207, 214, 223, 195; 29/257, 227, 217

[56] References Cited

UNITED STATES PATENTS

| | | | |
|---|---|---|---|
| 2,675,839 | 4/1954 | Beasley | 269/249 X |
| 626,604 | 6/1899 | Gaff | 269/238 X |
| 140,852 | 7/1873 | Sinclair | 269/238 X |

FOREIGN PATENTS OR APPLICATIONS 766,545 | 1/1957 | Great Britain | 269/207

Primary Examiner—Granville Y. Custer, Jr.
Assistant Examiner—Roscoe V. Parker
Attorney—Robert W. Beach

[57] ABSTRACT

The upper end of a wheel mount spanning bar has a pointed hook engageable with the upper control arm of a wheel suspension adjacent to the upper ball joint. A slide which can be latched in various positions along the spanning bar carries a pivoted angle having a threaded aperture in its swinging end to receive a screw having a pointed end engageable with the lower control arm of the wheel suspension adjacent to the lower ball joint. Pivoted cam lugs bearing on the slide can swing the angle relative to the slide for moving the screw toward the spanning bar hook to relieve the load from the ball joints and check their backlash. The degree of angle to slide movement is indicated by a scale.

10 Claims, 7 Drawing Figures

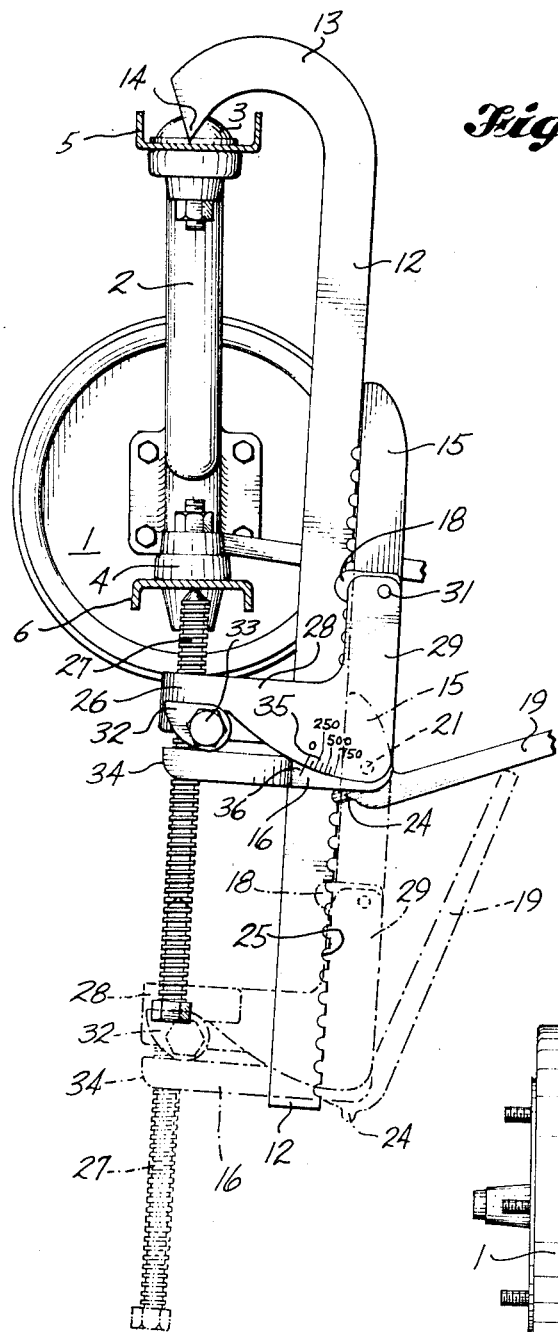
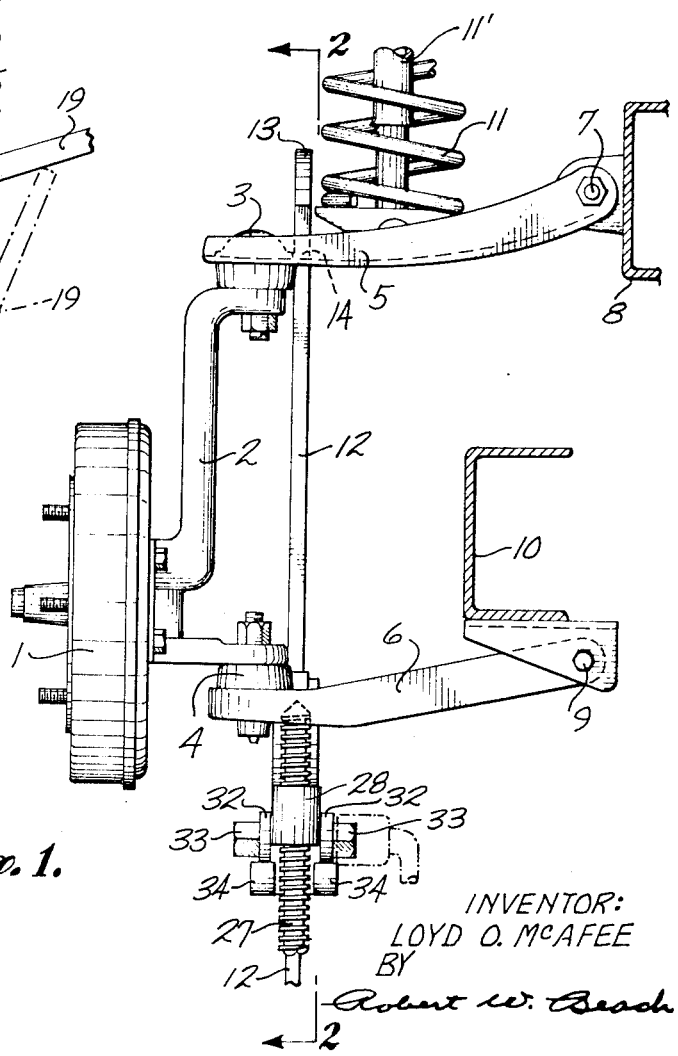
Fig. 2.
Fig. 1.
INVENTOR:
LOYD O. McAFEE
BY
Robert W. Beach
ATTORNEY

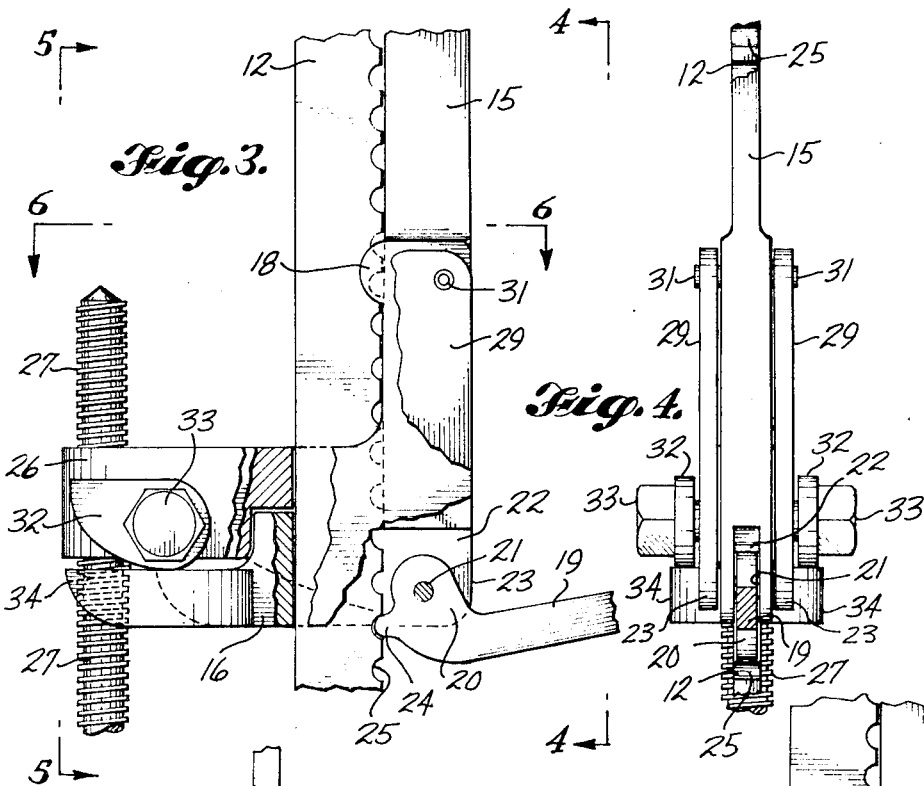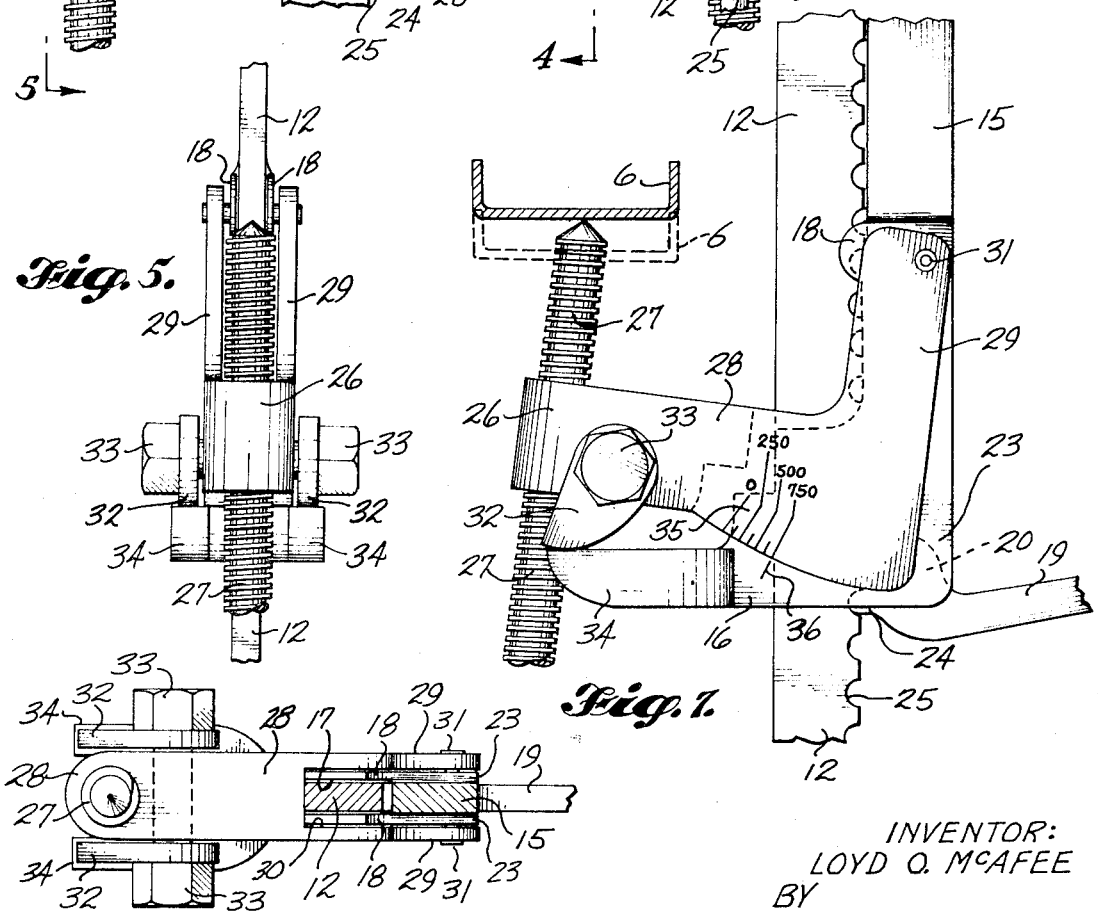

AUTOMOTIVE WHEEL SUSPENSION BALL JOINT TONGS

A principal object of the present invention is to provide automotive wheel suspension ball joint tongs which can be applied to a wide variety of wheel suspensions, and for this purpose is compact; while at the same time the tongs can be adjusted readily in effective length for application to wheel suspensions having ball joints spaced apart different distances over a wide range.

A further object is to provide such a versatile tongs which is readily adjustable over a wide range and includes both a coarse adjustment quickly variable and a fine adjustment for accurate setting.

Another object is to provide such tongs which can be applied quickly and easily to a wheel suspension and which are simple to operate.

It is also an object to provide such tongs which can apply considerable force to a wheel suspension without slipping relative to such wheel suspension, and the relatively movable parts of which tongs will not slip relative to each other.

It is an object to provide such wheel suspension tongs that can be used to apply a contracting force to the arms of a wheel suspension either for test purposes or to enable ball joints to be installed in or removed from the wheel suspension.

In utilizing the tongs for checking the backlash in ball joints, it is an object to be able to apply the tongs to the wheel suspension and to maintain them securely in engagement with the wheel suspension without attention on the part of the operator until it is desired to make the test. In making the test it is an object to be able to obtain a comparative indication of the backlash present in the ball joints.

An additional object is to provide such tongs which are strong and rugged, yet which can be manufactured economically.

It is also an object to provide such tongs which can be contracted into a condition sufficiently compact to be stored and shipped readily.

FIG. 1 is a transverse elevation of a typical automotive wheel suspension showing the tongs of the present invention applied to it, and FIG. 2 is a longitudinal vertical section taken on line 2—2 of FIG. 1.

FIG. 3 is a fragmentary side elevation of the lower portion of the tongs corresponding to the illustration of FIG. 2 but on an enlarged scale and having parts broken away.

FIG. 4 is a fragmentary edge elevation of the lower portion of the tongs as viewed from line 4—4 of FIG. 3, with parts broken away, and FIG. 5 is a fragmentary edge elevation of the lower portion of such tongs as viewed from line 5—5 of FIG. 3.

FIG. 6 is a horizontal section through the tongs along line 6—6 of FIG. 3.

FIG. 7 is a fragmentary side elevation of the lower portion of the tongs corresponding to FIG. 3, but showing parts in different positions.

The typical automotive wheel suspension shown in FIGS. 1 and 2 to which the tongs of the present invention are shown as being applied includes a wheel mount 1 carried by the spindle support 2. The upper end of such support is secured to the upper ball joint 3, and the lower end of such support is secured to the lower ball joint 4. The upper ball joint is received in its socket in the swinging end of the upper control arm 5, and the lower ball joint is received in its socket in the swinging end of the lower control arm 6. The inner end of the upper control arm is pivotally secured by the pivot bolt or pin 7 to an upper frame element 8, and the inner end of the lower control arm 6 is pivotally connected by the bolt or pivot pin 9 to the lower frame component 10.

The control arms 5 and 6 are normally pressed downwardly to counteract the upward pressure on the wheel mount 1 to support the load of the automotive vehicle by a spring 11 shown as engaging the upper side of the upper control arm 5. The shock absorber 11' extends through the central portion of the spring helix.

In order to check the ball joints 3 and 4 for excessive backlash or in order to remove the spindle support 2 and ball joints from the control arms it is necessary to draw together the two control arms. The tongs of the present invention provided for that purpose include the spanning bar 12 which is of a length greater than the spacing between the ball joints 3 and 4 of any automotive wheel suspension to which the tongs are to be applied. The upper end of the spanning bar carries a curved hook 13 having a sharp point or edge 14 engageable with the upper control arm 5 at a location adjacent to the ball joint 3.

The lower portion of the spanning bar 12 carries means engageable with the lower control arm 6 at a location adjacent to the lower ball joint 4. Because it is desirable for the tongs to be applied to various types of automotive wheel suspensions in which the spacing of the ball joints 3 and 4 may differ considerably, the spanning means carrying the elements engageable with the upper and lower control arms is variable in effective length.

The effective length of the spanning bar 12 can be altered readily over a wide range by providing a slide knee 15, 16, constituting primary length-adjusting means, including an upright portion 15 disposed alongside the spanning bar 12 and movable into different positions adjusted lengthwise of the spanning bar. The knee horizontal portion 16 extends transversely of the knee upright leg portion 15 so that the two portions are disposed substantially perpendicular to each other. As indicated in FIGS. 3 and 6, the root end of the horizontal leg portion 16 has a slot 17 extending through it of a size sufficient to enable the shank of the spanning bar 12 to pass through it.

The upright leg portion 15 is maintained in coplanar registry with the shank of the spanning bar 12 by parallel guide lugs 18 projecting from the edge of the upright leg portion 15 into positions overlapping the opposite sides respectively of the spanning bar shank. It is preferred that the slide knee be slidable freely along the shank of the spanning bar 12, but capable of being held securely in any one of a wide number of possible locations along the spanning bar by quickly-engageable latch mechanism. Such latch mechanism can be engaged by swinging a latch arm 19 through a small angle to turn the latch head 20 about a pivot 21.

The junction of the upright leg portion 15 of the slide knee and the horizontal leg portion 16 has in it a deep notch communicating with the slot 17 in the knee through which the shank of the spanning bar 12 extends. The head 20 of the latch actuator is received in such notch and the pivot 21 extends through the bifurcations 23 forming the opposite sides of the notch. A latch pawl 24 projecting generally radially from the head 20 is engageable in any one of the pawl-receiving notches or recesses 25 provided in the edge of the spanning bar 12 adjacent to the upright portion 15 of the slide knee.

The mechanism for engaging the lower control arm 6 includes an internally threaded sleeve 26 through which is screwed a long screw 27 having a pointed end engageable with a portion of the lower control arm 6 adjacent to the lower ball joint 4. Such point will prevent the screw end from slipping relative to the control arm. The sleeve 26 is carried by the horizontal leg portion of an external knee 28,29, constituting secondary length-adjusting means, which fits over the internal slide knee. The upright leg portion 29 of such external knee is bifurcated to form a deep notch 30 receiving the slide knee. The external knee is swingably mounted on the internal knee by pivot pins 31 extending through the external knee upright portion bifurcations 29 and the upright leg portion 15 of the slide knee as shown in FIGS. 3 and 4.

The external knee 28,29 can be swung relative to the slide knee by pivoted cam lugs 32 mounted on opposite ends of a shaft 33. The shaft ends are formed as heads to which a wrench can be applied. The curved cam edges of lugs 32 bear against ledges 34 formed on the horizontal leg portion 16 of the slide knee. The degree to which the external knee is swung relative to the slide knee by rotation of the cam lugs 32 is indicated by a scale 35 on the horizontal leg portion 28 of the external knee, which cooperates with the index mark 36 on the horizontal leg portion 16 of the slide knee.

In applying the tongs to a wheel suspension the latch arm 19 is raised to disengage the latch pawl 24 from the spanning bar 12. With the pointed tip of the screw 27 fairly close to the internally threaded sleeve 26, the slide 15 is shifted along the spanning bar 12 until the distance between the hook point 14 and the pointed tip of screw 27 is substantially greater than the spacing of the upper control arm 5 and the lower control arm 6. Either the latch bar 19 can be swung downward to engage latch pawl 24 with a pawl-receiving notch 25 of spanning bar 12 approximately in this position.

Alternatively, the point 14 of the spanning bar hook 13 can be engaged with the upper control arm 5, and the slide can be raised until the pointed tip of screw 27 is close to the lower control arm 6 but not in engagement with it. The latch bar 19 can then be swung down so that its pawl 24 engages a notch 25 approximately in this position. The screw 27 can then be turned relative to the threaded sleeve 26 by engagement of a wrench with the head on the lower end of the screw until the pointed screw tip is firmly engaged with the underside of the control arm 6. The chisel point 14 of hook 13 and the conical point on the end of screw 27 will maintain the tongs in such engagement with the wheel suspension.

If it is desired to determine the amount of backlash in ball joints 3 and 4, a wrench preferably of the socket type, as indicated in phantom in FIG. 1, will be applied to one of the heads on the opposite ends of shaft 33. Swinging the wrench handle will turn such shaft and thereby swing cam lugs 32 from the position of FIG. 3 toward the position of FIG. 7. The ledges 34 on the horizontal portion 16 of the slide knee will be held stationary relative to the spanning bar 12, and the point 14 of hook 13 by the engagement of the latch pawl 24 with the selected notch 25 of the spanning bar 12.

The arcs of the cam edges of lugs 32 are not concentric with the center of shaft 33. Consequently, as such shaft is rotated in a counterclockwise direction from the position of FIG. 3 toward the position of FIG. 7, the bearing of the cam edges on the ledges 34 will pry the horizontal arm 28 of the external knee, and consequently the internally threaded sleeve 26 and the screw 27 threaded through it away from the ledges 34. Such cam movement will raise the lower control arm 6 relative to the upper control arm 5, such as from the lower broken-line position shown in FIG. 7 to the upper solid-line position.

The degree of movement of the lower control arm 6 relative to the upper control arm 5 which can thus be effected by rotation of shaft 33 and cam lugs 32 corresponds to the amount of backlash of the ball joints 3 and 4 because the spindle support 2 is rigid and the relative movement of the control arms 5 and 6 is made possible only by looseness in the ball joints.

Since rotation of shaft 33 to swing the cam lugs 32 will swing the upright leg portions 29 of the external knee relative to the internal or slide knee, the degree of backlash in the ball joints 3 and 4 can be indicated by the relative swinging of such knees. Such degree of swinging can be indicated by index means cooperating between an upright leg portion 29 of the external knee and the internal knee. To provide such index means the end of the external knee upright leg portion 29 remote from pivot 31 is curved substantially concentrically of the axis of pivot 31 and carries a scale 35 having circumferentially spaced radial marks which cooperate with an index mark or pointer 36 on the internal knee.

To obtain the most accurate reading of backlash of the ball joints 3 and 4, it is preferred that the screw 27 be adjusted relative to sleeve 26 so that a line perpendicular to the axis of the screw extending through the screw tip will intersect the axis of the yoke pivot 31. Under these circumstances the distance that the tip of screw 27 is moved circumferentially around the pivot 31 will be substantially directly proportional to the angle through which the external knee is swung about such pivot relative to the internal knee. Consequently, the graduation of scale 35 can be spaced equidistantly to correspond directly to displacement distances of the lower control arm 6 relative to the upper control arm 5.

The markings of scale 35 shown in FIG. 7 are 250 to designate one-quarter of an inch, 500 to designate one-half an inch, and 750 to designate three-quarters of an inch displacement of the lower control arm 6 relative to the upper control arm 5. The correlation between the displacement of the point of screw 27 and the swinging of the external knee relative to the internal knee will not be as precise if the screw 27 does not project as far from the horizontal portion 28 of the knee or projects farther from such knee portion than that degree of projection in which a line perpendicular to the axis of screw 27 will intersect the axis of pivot 31, but the reading on the scale 35 will still be reasonably accurate.

Another purpose for which the tongs can be used effectively is to position the upper and lower control arms 5 and 6 relatively and to hold such control arms in such a relative position. During such operation the shaft 33 will remain free so that the horizontal portion 28 of the external knee or the portions of the cam lugs 32 closest to the axis of shaft 33 will bear on ledges 34 of the slide knee as shown in FIGS. 2 and 3. The upright portion 15 of the slide knee is then positioned lengthwise of the spanning bar 12 as described previously, and the latch arm 19 swung to engage pawl 24 with the appropriate notch 25 of the spanning bar to position the tip of screw 27 adjacent to the lower control arm 6.

The screw 27 can then be rotated by applying a wrench to its head to bring the conical tip of the screw into engagement with the lower control arm. Thereafter rotation of the screw is continued to relieve the weight of the lower control arm from the spindle support 2. The nuts can then be removed from the bolts by which the spindle support is connected to the ball joints 3 and 4, after which the screw 27 can be rotated reversely to enable the lower control arm 6 to swing downward relative to the upper control arm sufficiently to enable the spindle support to be removed from its mounting bolts.

With the spindle support 2 removed, either or both ball joints 3 and 4 can be removed and replaced. The spindle support can then again be inserted between the ball joints and the screw 27 rotated to raise the lower control arm 6 so that the spindle support arms will be engaged with the ball joint bolts. The spindle-support-securing nuts can then be replaced to complete the reassembly of the wheel suspension structure. Screw 27 can then be rotated to retract the screw for withdrawing it from engagement with the lower control arm 6 so that the tongs can be removed from the wheel suspension.

I claim:

1. In tongs, spanning means for applying to the upper and lower control arms of a wheel suspension a force for moving such control arms toward each other, including an upright bar, primary adjustable means adjustable along the upright bar to vary the effective length of the spanning means, holding means for securing the primary adjustable means in a selected adjusted position along the upright bar, and secondary adjustable means carried by the primary adjustable means and adjustable to vary further the effective length of the spanning means, the improvement comprising the primary adjustable means having an arm projecting transversely of the upright bar separate from and independent of both the secondary adjustable means and the holding means, and moving means separate from and independent of the holding means, reacting between said arm and the secondary adjustable means for effecting relative movement of the primary adjustable means and of the secondary adjustable means to relieve stress on the joints of the automobile wheel suspension while the holding means is securing the primary adjustable means in such a selected adjustable position relative to the upright bar and the secondary adjustable means maintains a preset adjustment.

2. In the tongs defined in claim 1, in which the spanning means upright bar having a hook on its upper portion with only a single point said point of the hook being engageable with the upper control arm.

3. Tongs for relieving stress on automobile wheel suspension joints comprising upright spanning means to extend alongside a wheel suspension and supported from the upper control arm of the wheel suspension, a knee including an upright portion and a generally horizontal portion projecting laterally from the lower part of said upright portion, pivot means connecting the upper part of said upright portion of said knee to said spanning means, screw means carried by the part of said generally horizontal portion of said knee remote from said upright portion and operable to engage the lower control arm of the wheel suspension generally on a level with said pivot means, means for effecting swinging of said knee about said pivot means relative to said upright spanning means for effecting approach movement of the upper and lower control arms, and means for indicating the degree of generally horizontal swinging of the lower part of said upright portion of said knee to reflect the amount of elevational displacement of the portion of the wheel suspension lower control arm engaged by said screw means.

4. In tongs defined in claim 1, the moving means including cam means engageable between the arm and the secondary adjustable means.

5. In tongs defined in claim 4, the cam means including a swingable lug having an arcuate cam surface carried by the secondary adjustable means and engageable with the arm.

6. In tongs defined in claim 1, indicating means cooperating between the primary adjustable means and the secondary adjustable means for indicating relative movement of the upper control arm and the lower control arm generally in proportion to the amount of movement of the moving means.

7. In tongs for relieving stress on automobile wheel suspension joints including upright spanning means to extend alongside a wheel suspension for applying to the upper and lower control arms of the wheel suspension a force for moving such control arms toward each other, a first part mounting an adjustable screw and a second part carried by the upright spanning means, movable relative to the upright spanning means to vary the effective span thereof and carrying the first part, the improvement comprising the first part including a knee having a leg at one side of the knee angle pivotally connected to the second part and a leg at the other side of the knee angle carrying the screw, and moving means for effecting relative movement of the first part and the second part while the second part remains stationary relative to the spanning means.

8. In tongs defined in claim 7, the second part including a slide to which the knee is pivotally connected, and the upright spanning means including a spanning bar on which said slide is mounted for movement therealong.

9. In tongs, upright spanning means to extend alongside a wheel suspension for applying to the upper and lower control arms of the wheel suspension a force for moving such control arms toward each other, primary means adjustable to vary the effective length of the spanning means, and secondary means carried by the primary means and adjustable to vary further the effective length of the spanning means, the improvement comprising the secondary means including a knee having a leg at one side of the knee angle pivotally connected to the primary means and a leg at the other side of the knee angle carrying the secondary means, and moving means for effecting relative movement of the primary means and of the secondary means while each of the primary means and the secondary means maintains a preset adjustment.

10. In the tongs defined in claim 9, the primary means including a slide to which the knee is pivotally connected, and the upright spanning means including a spanning bar on which said slide is mounted for movement therealong.

* * * * *

PO-1050
(5/69)

UNITED STATES PATENT OFFICE
CERTIFICATE OF CORRECTION

Patent No. 3,736,816  Dated June 5, 1973

Inventor(s) Loyd O. McAfee

It is certified that error appears in the above-identified patent and that said Letters Patent are hereby corrected as shown below:

Column 5, line 59, cancel "in which"; line 61, insert a comma after "point" (first instance).

Signed and sealed this 27th day of November 1973.

(SEAL)
Attest:

EDWARD M. FLETCHER, JR.  RENE D. TEGTMEYER
Attesting Officer  Acting Commissioner of Patents